(12) United States Patent
Tovander

(10) Patent No.: US 6,519,332 B1
(45) Date of Patent: Feb. 11, 2003

(54) MECHANISM FOR REJECTING COLLECT CALLS

(75) Inventor: Lars A. Tovander, Plano, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/192,085

(22) Filed: Nov. 13, 1998

(51) Int. Cl.$^7$ .......................... H04M 1/66; H04M 3/42; H04M 15/06; H04M 17/00

(52) U.S. Cl. ............. 379/196; 379/114.14; 379/127.02; 379/142.04; 379/144.02; 379/145; 379/201.01

(58) Field of Search ................................. 379/142, 196, 379/197, 198, 199, 201, 210, 211, 212, 114.14, 142.01, 142.04, 142.17, 142.18, 201.01, 201.02, 211.01, 211.02, 212.01, 114.21, 127.01, 127.02, 127.03, 127.04, 127.05, 127.06, 144.02, 145

(56) References Cited

U.S. PATENT DOCUMENTS

| | | | | |
|---|---|---|---|---|
| 4,277,649 A | * | 7/1981 | Sheinbein ................... | 379/201 |
| 5,329,578 A | * | 7/1994 | Brennan et al. ............ | 379/201 |
| 5,341,414 A | * | 8/1994 | Popke ......................... | 379/201 |
| 5,465,293 A | * | 11/1995 | Chiller et al. ............... | 379/189 |
| 5,524,145 A | * | 6/1996 | Parker ......................... | 379/197 |
| 5,550,904 A | * | 8/1996 | Andruska et al. ........... | 379/112 |
| 5,751,800 A | * | 5/1998 | Ardon ......................... | 379/134 |
| 5,809,125 A | * | 9/1998 | Gammino .................... | 379/189 |
| 5,937,043 A | * | 8/1999 | He .............................. | 379/114 |
| 6,031,899 A | * | 2/2000 | Wu .............................. | 379/142 |
| 6,130,937 A | * | 10/2000 | Fotta ........................... | 379/200 |

* cited by examiner

Primary Examiner—Harry S. Hong

(57) ABSTRACT

A mechanism for rejecting specific types of calls in a network including collect calls and telemarketing calls. Calls are tagged to indicate the type of call, this tag being recognizable at the terminating end of the network allowing automatic rejection of the call on a subscription basis. In one embodiment, an OLI parameter is utilized to tag the call. In another embodiment, another parameter such as Optional Forward Call Indicator is utilized. An end office serving the subscriber may automatically reject the call, or may pass on the call to a PBX serving multiple subscribers. The PBX may automatically reject all calls of a particular type, or may allow calls depending on the subscriber being called.

16 Claims, 1 Drawing Sheet

MECHANISM FOR REJECTING COLLECT CALLS

FIELD OF THE INVENTION

The present invention is generally related to communication systems including fixed and wireless networks, and particularly to a mechanism for automatically rejecting unwanted calls including collect and telemarketing calls, by a called subscriber.

BACKGROUND OF THE INVENTION

Communication networks are increasingly becoming more intelligent, offering subscribers a variety of enhanced and new services. For instance, service providers offer a number of services on a subscription basis including calling line identification (CLID), three way calling, call forwarding, as well as a variety of other services. Providing each of these services on a subscription basis is a major source of revenue for service providers, and sometimes a distinguishing competitive advantage over other service providers having more limited available services.

One particular calling service available today is collect calls. These toll calls are typically initiated using a reserved area code such as 800 and 888, such as 1-800-COLLECT. As can be appreciated, many service providers offer and advertise such services. The service providers of collect calls may be distinctly separate from a subscriber's primary service provider.

Collect calls are convenient for originating calling parties who don't have a calling card, wish to obtain lower collect rates, or simply do not want to incur the charges associated with making a long distance call. However, collect calls are also pervasively becoming more abused as some parties attempt to make "free" calls. A called party can simply verbally reject a collect call to the operator or network having voice recognition features, and may even simply hangup. Unfortunately, many collect calls are being accepted by a receiving party that should otherwise be rejected to avoid incurring collect charges. For instance, it is a significant problem today of employees accepting collect calls and obligating their employer to pay for the charges. As another example, employees are having calls directed to a work phone, and then forwarding this call to their home phone. By accepting the toll of the collect call at home the employer still is obligated to pay the charges. Although reviewing monthly charges of employee's calls and in turn charging the employee for personal calls is one option, this is extremely cumbersome and difficult considering that many long distance charges at the workplace are proper.

There is desire to provide an improved mechanism for rejecting unwanted calls, including collect and telemarketing calls, which service may be available on a subscription basis. This mechanism should be available for single subscriber lines as well as PBX serving multiple subscribers.

SUMMARY OF THE INVENTION

The present invention comprises a mechanism for rejecting particular unwanted calls on a subscription basis by identifying the call type using an Originating Line Information (OLI) parameter. For example, a distinctive OLI value is assigned to collect calls and telemarketing calls that is identifiable by a called terminating station serving a subscriber to identify the type of call. A called terminating station can automatically identify the particular OLI value associated with a call and automatically reject the type of calls. A single subscriber can subscribe to the service, as can an entire PBX. Alternatively, the PBX can be programmed to reject unwanted calls for particular subscriber lines served by the PBX on an individual basis. In another alternative, caller ID equipment can be programmed to reject calls. The OLI values apply to FgD trunks as well as ISUP as Information Digits, also known as II digits, in the MF Feature Group D signaling. For international applications, an Optional Forward Call Indicator (OFCI) parameter can be used. This mechanism to reject unwanted calls can be selectively overridden as a service option.

The method of the present invention includes identifying the type of a call in a communication network, where the call is directed from an originating station to a terminating station. The method comprising the steps of first initiating a call to the communications network, and then assigning a tag to the call. The tag is indicative to the call, i.e., a collect call or a telemarketing call, and is identifiable by the terminating station. The tag preferably comprises an Originating Line Information (OLI) value. The method further comprises the step of the terminating station automatically rejecting the received call in response to identifying the distinctive tag with the call. The terminating station may comprise a single line subscriber, or a PBX. Preferably, the PBX is programmable to selectively reject tagged calls with the predetermined value as a function of the called subscriber served by the PBX. The OLI information is sent with the protocol used between the end office and the PBX.

Another embodiment of the present invention comprises a communication network comprising a transit network, an originating station having means to initiate a call and direct the call to the transit network, and means for tagging the call with a tag indicative that the call is a particularly unwanted call. The network further comprises a terminating station coupled the transit network, the terminating station having means to identify the tag associated with a call directed to the terminating station. The terminating station further has means to reject the call in response to identifying-the tag associated with the unwanted call. The tag preferably comprises an Originating Line Information (OLI) value.

According to another embodiment of the present invention a terminating station is adapted to receive calls from a communication network. The terminating station has means for receiving the call from the communication network, and also has means for identifying a tag associated with the call directed to the terminating station indicative that the call is a particular unwanted call. The terminating station may further comprise means to automatically reject the call upon identifying the particular tag associated with the unwanted call. Preferably, the tag comprises an Originating Line Information (OLI) value.

The present invention can be implemented in end office, tandem, international gateways, and mobile networks.

DESCRIPTION OF THE PREFERRED EMBODIMENT

Figure 1:
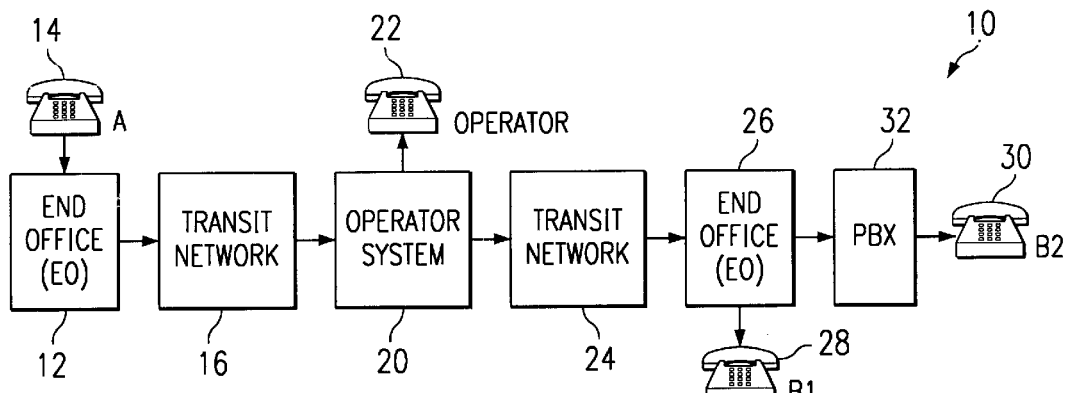
FIG. 1 is a block diagram of a communication network implementing the mechanism of the present invention and adapted to serve an originating subscriber A and terminating subscribers B1 and B2.

Referring now to FIG. 1, there is illustrated generally at 10 a communication network implementing the mechanism of the present invention. Network 10 is seen to include an originating end office 12 serving an originating subscriber 14, labeled A. Originating end office 12 may serve subscriber 14 by conventional twisted pair wiring as well as other wireline mediums, but it can also serve subscriber 14 via RF links in a wireless environment if desired. End office 12 is coupled to a transit network 16 which serves to route calls to and from end office 12. Transit network may be a public switched telephone network (PSTN) or other equivalent networks suited to communicate calls between an originating station and a terminating station. Transit network 16 is seen to be coupled to and interfaced with an operator system 20 which is operated by an operator 22. Operator 22 may comprise a person or an automated system having voice/tone recognition capabilities.

Operator system 20 is seen to interface between the originating transit network 16 and a terminating transit network 24, which also may be a PSTN. Transit network 16 and 24 may collectively be referred to and viewed as single transit network comprising a single PSTN with operator intervention capabilities such that calls through the transit network can be serviced and routed by operator system 20. Transit network 24 is seen to be coupled to and service an end office 26. End office 26 may comprise of a local switch routing calls from the transit network 24 to subscribers according to conventional means. End office 26 services multiple subscribers including a single line subscriber 28, labeled B1, and multiple subscribers 30, labeled B2, via servicing PBX 32. Network 10 described so far is well known in the art and is adapted to be improved according to the present invention as will now be described.

Still referring to FIG. 1, the present invention provides a mechanism for automatically identifying and rejecting unwanted calls originated by originating subscriber 14 to terminating subscribers 28 and 30. More specifically, the mechanism of the present invention provides a means by which receiving subscribers 28 and 30 can automatically and electronically identify an incoming call originated by originating subscriber 14 as a particular type of call that the subscriber may wish to screen, such as collect calls, telemarketing calls, and the like. The mechanism is available on a subscription basis and can be implemented in existing network equipment. For purposes of the present invention, the mechanism is described with reference to identifying collect calls originated by originating subscriber 14 with it being understood that the present invention can be used to tag, identify and selectively screen other types of unwanted calls.

Calls originated by subscriber 14 are tagged to indicate the type of call, this tag being attached by operator system 20 and delivered with the call to the end office 26. End office 26 has means to receive and identify this tag to ascertain the type of call. Specifically, end office 26 has suitable hardware and software available on a subscription basis to the subscribers 28 and 30 by which calls of a specific nature, i.e., collect calls or telemarketing calls, can be automatically identified and rejected rather than delivered to the subscriber.

According to the preferred embodiment of the present invention, the tagging of calls is performed by using an Originating Line Indicator (OLI) parameter whereby a specific OLI value is reserved and identifies a particular type of call. For instance, one reserved value can indicate that the call is a collect call, whereby another reserved value is associated with another type of call to be screened, i.e., telemarketing calls. These OLI values are administered by the North American Numbering Plan (NANP) Administration at Bell Communications Research Inc., and are provided for in various standards. The OLI values also apply to the Information Digits, also known as II Digits, MF Feature Group D Signaling. The operator system 20 attaches this OLI value to the call as a the function of the type of call. In the illustrative embodiment here, the value is indicative of the call being a collect call. This OLI value is transmitted along with the call through transit network 24 through the end office 26. This OLI value is identifiable by the end office 26 on a subscription basis, and can be implemented with minor modifications to the existing hardware and software at existing end offices 26. Further, collect calls can be selectively passed by end office 26 to serving PBX 32 which may in turn determine if a call should be accepted or not, either globally, or on a case by case basis depending on which subscriber 30 is being called. Thus, PBX 32 can selectively accept or reject calls, automatically, depending on the service to be provided to the serving subscribers 30. This service is provided on a subscription basis and the rate is determined by a service provider.

To further understand the present invention, the mechanism of the present invention will now be discussed in considerable detail with regard to the flow diagram illustrated in FIG. 2.

Figure 2:
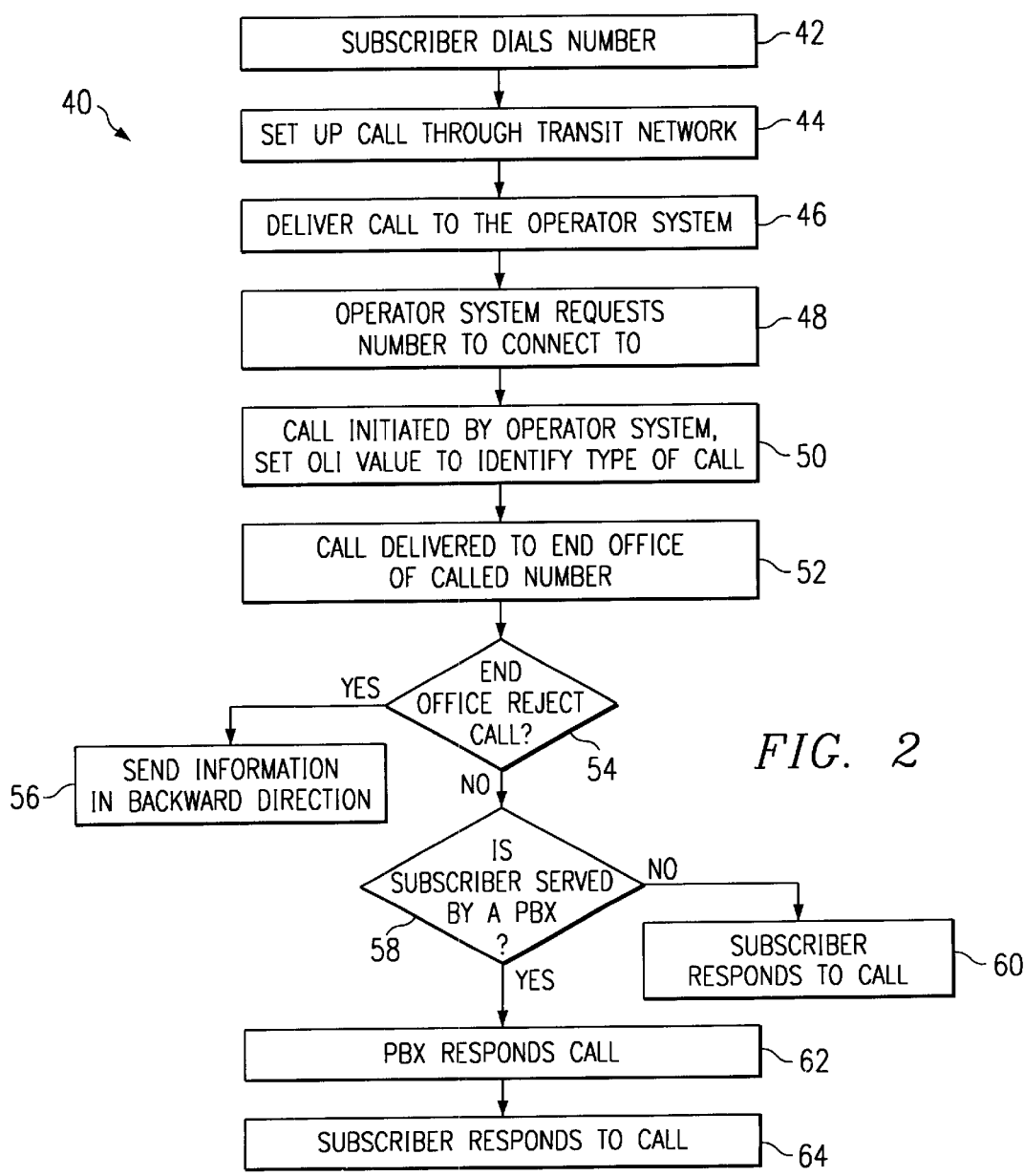
FIG. 2 is a flow diagram of the method of the present invention.

Referring now to FIG. 2, there is shown the method of the present invention generally at 40 whereby initiated calls are tagged and screened. At step 42, originating subscriber 14, depicted at A in FIG. 1, dials a number for a collect call service, i.e., 1-800-COLLECT. This call is initiated via end office 12 serving the originating subscriber 14.

At step 44, the call is setup through the transit network 16. Network 16, in turn, sets up the OLI value for originating subscriber 14 to a value defined representing the calling subscriber.

Next, at step 46 the call is delivered by the transit network 16 to the operator system 20 handling collect calls for transit network 16 with the OLI value set to indicate the collect call.

At step 48, the operator system 20 requests the originating subscriber 14 to specify the number of receiving subscriber intending to be called.

At step 50, the call is initiated by the operator system 20 whereby the OLI value is set i.e. modified from the value established in step 44 to identify the call as a collect call. For telemarketing calls, the distinctive OLI value indicating a telemarketing call is already established in step 44 as a telemarketing firm's lines.

At step 52, the call is delivered via the transit network 24 to the end office 26 serving the subscriber being called.

At step 54, the call is delivered to the end office 26 serving the called subscriber. The end office 26 may, depending on subscription information for the called subscriber, automatically reject the call due to OLI restrictions, and information is sent in a backward direction through the transit network 24 and 16 to the end office 12 serving originating subscriber 14 indicating that the call was rejected. In the case of ISUP/ISDN signaling, the parameter CAUSE is set to equal "Call Rejected." In case of MF signaling, proper inband information is sent e.g. re-order tone or announcement.

If the end office 26 does not reject the call in step 54, at step 58 it is determined whether subscriber is served by a PBX. If not, the call is routed directly to the called subscriber 28, labeled B1, whereby the subscriber can verbally accept or reject the call, or the subscriber can automatically accept/reject the call using tones, such as pressing "1" to accept where touch tones are recognizable.

If at step 58 the called subscriber 30 is served by a PBX 32, i.e., B2, the call is delivered to the PBX 32 whereby the OLI value identifies the call as a collect call as included in the call setup. The PBX 32 may, based on the OLI value, decide to reject the call, either as a default handling and no extension is allowed to accept collect calls, or, depending on the extension of the call i.e., the particular subscriber 30 being called, the PBX may route the call to subscriber 30 if this subscriber is allowed to accept collect calls. Yet in another possibility, the call may be routed by the PBX to the operator of the PBX who may determine whether the call should be ultimately routed to the particular called subscriber at step 62.

At step 64, if the call is allowed by the PBX and routed to the subscriber 30, subscriber 30 can verbally accept or reject the call, or accept the call using touch-tones such as pressing "1" to accept.

As previously indicated, other OLI values can be set to identify other types of calls, such as telemarketing calls, whereby an end office and/or PBX can be programmed on a subscription basis to automatically accept or reject such calls thereby screening these type of calls. Limitation to screening collect calls is not to be intended, but rather, the present invention is intended to cover screening calls on a subscription basis that a subscriber may wish to reject automatically.

A further alternative mechanism according to the present invention is by broadening the Information of a call, i.e., that the call is a collect call, or telemarketing call by sending information in another available parameter e.g., Optional Forward Call Indicators (OFCI). This implementation makes it possible to use the function in non ANSI markets as well, which requires changes to existing standards, i.e., ANSI T1.113, ITU-T Q.763. Thus, other call indicators can be used that are associated with a routed call to provide a tag to the receiving end of the call i.e., the end office and PBX, indicative of the type of call so that the call can be automatically rejected or accepted on subscription basis.

The present invention derives technical advantages by allowing subscribers to automatically reject unwanted calls, i.e., collect calls and telemarketing calls. This allows, for instance, employers to electronically prevent certain types of calls from being completed to employees thus reducing charges associated with these calls. It also provides benefits by allowing subscribers, either private or business subscribers, to screen out unwanted calls thereby reducing inherent time and frustration associated with these types of calls. This call blocking subscription can be overridden by the subscriber when desired, such as on weekends when the subscriber may wish to accept collect calls or a specific time when a subscriber wishes to receive an expected collect call.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. A method of identifying a type of call in a communications network, said call being directed from an originating station to a terminating station, comprising the steps of:

initiating a call to said communications network;

assigning a tag to said call, wherein said tag comprises an Originating Line Information (OLI) value identifying the type of said call; and said terminating station rejecting said call according to said OLI value.

2. The method as specified in claim 1 wherein said terminating station comprises a single-line subscriber device.

3. The method as specified in claim 1 wherein said terminating station comprises a PBX.

4. The method as specified in claim 3 wherein said PBX is programmable to selectively reject said tagged calls as a function of a subscriber served by said PBX intended to receive said call.

5. The method as specified in claim 1 wherein said OLI value identifies a collect call.

6. The method as specified in claim 1 wherein said OLI value identifies a telemarketing call.

7. The method as specified in claim 5 wherein a collect call service provider establishes said tag to identify said call as a collect call.

8. A communication network, comprising:

a transit network;

an originating station having means to initiate a call and direct said call to said transit network;

a tagging means for associating a tag comprising an Originating Line Information (OLI) value with said call wherein said OLI value identifies the type of said call;

a terminating station coupled to said transit network, said terminating station operable to identify said OLI value and automatically reject said call according to said OLI value.

9. The network as specified in claim 8 wherein said call comprises a collect call.

10. The network as specified in claim 8 wherein said tagging means comprises a collect call service provider.

11. The network as specified in claim 8 wherein said OLI value identifies a telemarketing type call.

12. A terminating station adapted to receive calls from a communication network, comprising:

a receiver for receiving said calls from said communication network said receiver operable to identify a tag comprising an Originating Line Information (OLI) value and to automatically reject said call according to said OLI value.

13. The terminating station as specified in claim 12 wherein said tag comprises an Optional Forward Call Indicator (OFCI) value.

14. The terminating station as specified in claim 12 wherein said OLI value identifies said call as a collect call.

15. The terminating station as specified in claim 12 wherein said OLI value identifies said call as a telemarketing call.

16. The terminating station as specified in claim 12 wherein said terminating station comprises a PBX.

* * * * *